United States Patent
Gal (10) Patent No.: US 10,952,305 B2
(45) Date of Patent: Mar. 16, 2021

(54) CONFIGURABLE LIGHTING SYSTEM AND METHOD COMPRISING A PROGRAMMABLE CONTROL MODULE THAT CONTROLS A PLURALITY OF DIFFERENT PATTERNS BASED ON TOGGLING A POWER SUPPLY

(71) Applicant: SIGNIFY HOLDING B.V., Eindhoven (NL)

(72) Inventor: Jean-Philippe Gal, Hong Kong (CN)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 15/514,769

(22) PCT Filed: Mar. 11, 2016

(86) PCT No.: PCT/CN2016/076143
§ 371 (c)(1),
(2) Date: Mar. 27, 2017

(87) PCT Pub. No.: WO2017/152417
PCT Pub. Date: Sep. 14, 2017

(65) Prior Publication Data
US 2018/0368237 A1    Dec. 20, 2018

(51) Int. Cl.
*H05B 47/19*    (2020.01)
*H05B 47/10*    (2020.01)
(Continued)

(52) U.S. Cl.
CPC ............ *H05B 47/19* (2020.01); *H05B 47/10* (2020.01); *H05B 47/105* (2020.01); *H05B 47/155* (2020.01); *H05B 47/16* (2020.01)

(58) Field of Classification Search
CPC ............ H05B 37/0272; H05B 33/0845; H05B 33/0815; H05B 37/0254; H05B 33/0818;
(Continued)

(56) References Cited

U.S. PATENT DOCUMENTS

2009/0179596 A1* 7/2009 Willaert ............. H05B 37/0272
                                                          315/313
2010/0134042 A1* 6/2010 Willaert ............... H05B 47/175
                                                          315/294
(Continued)

FOREIGN PATENT DOCUMENTS

| CN | 101444144 A | 5/2009 |
| CN | 101675712 A | 3/2010 |

(Continued)

OTHER PUBLICATIONS

Extended European Search Report, dated Feb. 8, 2018, for European Application No. 16845314.0-1204, 10 pages.
(Continued)

*Primary Examiner* — Borna Alaeddini
(74) *Attorney, Agent, or Firm* — Patrick T. Driscoll (57) ABSTRACT

A configurable lighting system including a lighting unit having an illumination module and a programmable control module; a light switch configured for electrical communication with the lighting unit via an electrical circuit and being operable in a first and a second operational position such that the illumination module, in response to operation of the light switch in the first and the second operational positions, is able to output a first set of illumination modes; and, a programming unit configured for wireless communication with the programmable control module of the lighting unit via a wireless communication link wherein the programming unit includes a programming interface via which the programmable control module of the lighting unit is able to be programmed such that, in response to different patterns (Continued)

of movement of the light switch between the first and second operational positions, the illumination module is controlled by the programmable control module to output a second set of illumination modes having a greater number of illumination modes than that of the first set of illumination modes.

20 Claims, 3 Drawing Sheets

(51) Int. Cl.
  *H05B 47/16* (2020.01)
  *H05B 47/105* (2020.01)
  *H05B 47/155* (2020.01)

(58) Field of Classification Search
  CPC ............ H05B 33/0848; H05B 33/0854; H05B 33/0863; H05B 37/02; H05B 37/0209; H05B 37/0227; H05B 33/0803; H05B 33/0827; H05B 33/083; H05B 33/0851; H05B 33/0857; H05B 33/0872; H05B 33/0884; H05B 39/086; H05B 41/2828; H05B 47/19; H05B 47/10; H05B 47/16; H05B 47/105
  See application file for complete search history.

(56) References Cited

U.S. PATENT DOCUMENTS

| | | | |
|---|---|---|---|
| 2012/0242247 A1* | 9/2012 | Hartmann | H05B 33/0863 |
| | | | 315/294 |
| 2016/0066397 A1 | 3/2016 | Alexander et al. | |
| 2016/0120001 A1* | 4/2016 | Clark | H05B 45/20 |
| | | | 315/153 |
| 2017/0347415 A1* | 11/2017 | Cho | H05B 45/10 |
| 2018/0004271 A1* | 1/2018 | Knappenberger | H04B 1/1615 |
| 2019/0096614 A1* | 3/2019 | Fehl | H01H 47/001 |

FOREIGN PATENT DOCUMENTS

| | | |
|---|---|---|
| CN | 101784143 A | 7/2010 |
| CN | 102307420 A | 1/2012 |
| CN | 204648074 U | 9/2015 |
| WO | 2012/006150 A1 | 1/2012 |
| WO | 2015/184530 A1 | 12/2015 |

OTHER PUBLICATIONS

International Search Report and Written Opinion, dated Dec. 9, 2016, for International Application No. PCT/CN2016/076143, 10 pages.

* cited by examiner

CONFIGURABLE LIGHTING SYSTEM AND METHOD COMPRISING A PROGRAMMABLE CONTROL MODULE THAT CONTROLS A PLURALITY OF DIFFERENT PATTERNS BASED ON TOGGLING A POWER SUPPLY

TECHNICAL FIELD

The present invention relates to systems and methods for controlling lighting units.

BACKGROUND OF THE INVENTION

Many lighting units such as lamps and luminaires are typically operated by control devices in the form of wall-mounted electrical switches or infrared remote controls. Whilst these types of control devices are suitable for operation of basic functionality such as switching the lighting units on or off, the basic design of these types of control devices means that they are limited in their ability to enable users to easily and conveniently access and control the full capabilities of more advanced lighting unit functions such as light dimming, white colour temperature tuning, and colour output adjustment.

In seeking to address the deficiencies in existing control devices such as electric switches and infrared remote controls, certain advanced lighting units are provided with integrated intelligence whereby a pre-defined advanced lighting function is output in response to detection of a specific operation of the electric switch or infrared remote control. For instance, the lighting unit may be preconfigured to emit a warm white light upon detection of the first time the electric switch is used to turn on the lighting unit, and then will emit a cool white light if the electric switch is turned on again within a predetermined period of time. However, whilst this integrated intelligence may be useful to certain users, it will not suit the preferences of all users and because this intelligent functionality is embedded in the lighting unit during manufacture, it is not possible for users to customise the intelligent functionality to respond in different ways.

Others attempts to improve user accessibility and control of the advanced lighting functions of lighting units have involved using radio frequency control devices such as mobile phones, tablets, laptop computers and wireless smart switches with touchscreen display interfaces via which users can enter control instructions with greater ease and flexibility. However, these radio frequency control devices tend to be expensive and complicated to install and configure for use as the primary control device. It is also not ideal for users to utilise these types of control devices as the primary control means as it is then inconvenient for the user to concurrently use the control device to perform other functions such as taking a telephone call, or when such a control device is being charged. Also, not all household members (for instance Children or visitors to a premises) may possess such a control device or have it available with them at all times so as to be able to operate the lighting unit. Moreover, if the radio frequency control device is used as the primary control device on a daily basis, it becomes more susceptible to wear and tear and is an expensive piece of equipment to have to repair if damaged.

Other solutions have sought to rely upon the use of overly-sophisticated and powerful wired smart controller devices such as smart switches, dimmers and RGB controllers that are based on the Digital Addressable Lighting Interface (DALI) international standard. However, this solution involves replacement of the existing lighting system switches and lighting units by DALI-standard compatible control devices and DALI-standard compatible lighting units which is expensive, complicated and time-consuming to install into the existing physical infrastructure. Whilst this may be suitable for certain enterprise-level users in a large-scale commercial environment, it may not be cost effective or practical for certain home users lacking a suitable budget and technical expertise to utilise. Furthermore, for many users, it is not desirable for them to have to replace the existing control devices and lighting units that are already installed as these may have been carefully selected to match the existing décor. Thus, if the user decides to replace the existing wired lighting infrastructure by installing new DALI-standard compatible control devices and lighting units, this is not only a relatively expensive and overly-sophisticated solution, but the user's choice of appearance of the new equipment is very limited and may not be aesthetically pleasing to the user's tastes and preferences.

SUMMARY OF THE INVENTION

The present invention seeks to alleviate at least one of the above-described problems.

The present invention may involve several broad forms. Embodiments of the present invention may include one or any combination of the different broad forms herein described.

In a first broad form, the present invention provides a configurable lighting system including:

a lighting unit having an illumination module and a programmable control module;

a light switch configured for electrical communication with the lighting unit via an electrical circuit and being operable in a first and a second operational position such that the illumination module, in response to operation of the light switch in the first and the second operational positions, is able to output a first set of illumination modes; and a programming unit configured for wireless communication with the programmable control module of the lighting unit via a wireless communication link wherein the programming unit includes a programming interface via which the programmable control module of the lighting unit is able to be programmed such that, in response to different patterns of movement of the light switch between the first and second operational positions, the illumination module is controlled by the programmable control module to output a second set of illumination modes having a greater number of illumination modes than that of the first set of illumination modes.

Preferably, the wireless communication link may include a radio frequency communication link based on at least one of a Wi-Fi, a Bluetooth and a Zigbee communication protocol.

Typically, the light switch may include at least one of a toggle type switch, a push-button type switch, a rocker type switch, a dimmer type switch, a pull-cord type switch, and an electronic type switch.

Typically, the patterns of movement of the light switch between the first and second operational positions may each be defined by at least one of following pattern of movement characteristics:

i. a number of times the light switch is moved between the first and second operational positions;
ii. a speed of movement of the light switch between the first and second operational positions;

iii. relative speeds of movement of the light switch between the first and second operational positions during multiple movements of the light switch between the first and second operational positions;
iv. a duration of time the light switch is maintained in at least one of the first and second operational positions during multiple movements of the light switch between the first and second operational positions;
v. relative durations of time the light switch is maintained in at least one of the first and second operational positions during multiple movements of the light switch between the first and second operational positions;
vi. a frequency of movements of the light switch between the first and second operational positions over multiple movements between the first and second operational positions;
vii. relative frequencies of movements of the light switch between the first and second operational positions during multiple movements of the light switch between the first and second operational positions;
viii. a time of day at which the light switch is operated; and
ix. a specific order or sequence in which characteristics defined in (i)-(viii) occur in the patterns of movement.

Typically, the illumination modes of the second set of illumination modes output by the illumination module may be defined by at least one of the following illumination mode characteristics:
i. an emitted colour characteristic;
ii. an emitted brightness characteristic;
iii. an emitted white light colour temperature;
iv. a rate of change in at least one of the illumination mode characteristics in (i)-(iii); and
v. a combination of any one of illumination mode characteristics in (i)-(iii).

Preferably, the programming unit may include at least one of a mobile phone, a tablet, and a computer.

Typically, the programming interface of the programming unit may be configured to allow a user to manually define the pattern of movement characteristics of at least one of the patterns of movement.

Typically, the programming interface of the programming unit may be configured to allow a user to manually define the illumination mode characteristics of at least one of the illumination modes.

Typically, the programming interface of the programming unit may be configured to allow a user to program the programmable control module to control the illumination module to output a specific illumination mode in response to a specific pattern of movement of the light switch.

Typically, at least one of the illumination modes and the patterns of movement that are able to be selected by a user via the programming interface of the programming unit is predefined.

Preferably, the programming interface may include at least one of a touchscreen display, a mouse-controllable input interface, a gesture-controllable input interface, and a voice-controllable input interface.

In a second broad form, the present invention provides a configurable lighting system including:
a lighting unit having an illumination module and a programmable control module;
an infrared remote control configured for infrared signal communication with the lighting unit via an infrared communication link, said infrared remote control including at least one control button operable in a first and a second operational state such that the illumination module, in response to operation of the at least one control button in the first and the second operational states, is able to output a first set of illumination modes; and
a programming unit configured for wireless communication with the programmable control module of the lighting unit via a wireless communication link wherein the programming unit includes a programming interface via which the programmable control module of the lighting unit is able to be programmed such that, in response to different patterns of operation of the at least one control button of the infrared remote control, the illumination module is controlled by the programmable control module to output a second set of illumination modes having a greater number of illumination modes than that of the first set of illumination modes.

Preferably, the wireless communication link may include a radio frequency communication link based on at least one of a Wi-Fi, a Bluetooth and a Zigbee communication protocol.

Typically, the patterns of operation of the at least one control button may each be defined by at least one of the following pattern of operation characteristics:
i. a number of times the at least one control button of the infrared remote control is operated;
ii. a speed of operation of the at least one control button of the infrared remote control;
iii. relative speeds of operation of multiple control buttons of the infrared remote control;
iv. a duration of time between operation of multiple control buttons of the infrared remote control;
v. relative durations of time between operation of multiple control buttons of the infrared remote control;
vi. a frequency of operations of the at least one control button;
vii. relative frequencies of operations of the at least one control button;
viii. a time of day at the at least one control button is operated; and
ix. a specific order or sequence in which characteristics defined in (i)-(viii) occur in the patterns of operation.

Typically, the illumination modes of the second set of illumination modes output by the illumination module may be defined by at least one of the following illumination mode characteristics:
i. an emitted colour characteristic;
ii. an emitted brightness characteristic;
iii. an emitted white light colour temperature;
iv. a rate of change in at least one of the illumination mode characteristics in (i)-(iii); and
v. a combination of any one of illumination mode characteristics in (i)-(iii).

Preferably, the programming unit may include at least one of a mobile phone, a tablet, and a computer.

Typically, the programming interface of the programming unit may be configured to allow a user to manually define the pattern of movement characteristics of at least one of the patterns of movement.

Typically, the programming interface of the programming unit may be configured to allow a user to manually define the illumination mode characteristics of at least one of the illumination modes.

Preferably, the programming interface of the programming unit may be configured to allow a user to program the programmable control module to control the illumination module to output a specific illumination mode in response to a specific pattern of operation of the at least one control button.

Typically, at least one of the illumination modes and the patterns of movement that are able to be selected by a user via the programming interface of the programming unit is predefined.

Preferably, the programming interface may include at least one of a touchscreen display, a mouse-controllable input interface, a gesture-controllable input interface, and a voice-controllable input interface.

In a third broad form, the present invention provides a lighting unit in accordance with any one of the broad forms of the present invention described herein.

In a fourth broad form, the present invention provides a method of configuring operation of a lighting system, the lighting system including:
 a lighting unit having an illumination module; and
 a light switch configured for electrical communication with the lighting unit via an electrical circuit and being operable in a first and a second operational position such that the illumination module, in response to operation of the light switch in the first and the second operational positions, is able to output a first set of illumination modes;
 wherein the method includes steps of:
  (i) providing a programming unit configured for wireless communication with a programmable control module of the lighting unit via a wireless communication link, the programming unit including a programming interface via which the programmable control module of the lighting unit is able to be programmed; and
  (ii) programming the programmable control module of the lighting unit via the programming interface of the programming unit, whereby in response to different patterns of movement of the light switch between the first and second operational positions, the illumination module is controlled by the programmable control module to output a second set of illumination modes having a greater number of illumination modes than that of the first set of illumination modes.

In a fifth broad form, the present invention provides a method of configuring operation of a lighting system, the lighting system including:
 a lighting unit having an illumination module; and
 an infrared remote control configured for infrared signal communication with the lighting unit via an infrared communication link, said infrared remote control including at least one control button operable in a first and a second operational state such that the illumination module, in response to operation of the at least one control button in the first and the second operational states, is able to output a first set of illumination modes;
 wherein the method includes steps of:
  (i) providing a programming unit configured for wireless communication with a programmable control module of the lighting unit via a wireless communication link, the programming unit including a programming interface via which the programmable control module of the lighting unit is able to be programmed; and
  (ii) programming the programmable control module of the lighting unit via the programming interface of the programming unit, whereby in response to different patterns of operation of the at least one control button of the infrared remote control, the illumination module is controlled by the programmable control module to output a second set of illumination modes having a greater number of illumination modes than that of the first set of illumination modes.

It will be apparent that embodiments of the present invention may assist in providing certain advantages including at least one of the following:

i. a cheap, quick and easy platform may be provided to allow for the relatively limited operational capabilities of existing control devices such as wall switches, dimmer controls, and infrared remote controls to be configurable by a user so as to control advanced lighting functionality of certain lighting units;
 ii. the cost and inconvenience of having to modify or replace the existing wiring infrastructure in a premises with new and more expensive control devices and lighting units such as DALI-standard compatible devices may be alleviated by implementation of embodiments of the present invention;
 iii. home users with relatively little technical expertise may be able to easily use this platform, as there is no installation or modification of wiring involved, and, safety risks to the home user associated with having to install devices and modify existing wiring is alleviated; and
 iv. the cost and complexity of having to utilise relatively expensive radio frequency control devices such as mobile phones, tablets, computers and smart switches having touchscreen display interfaces as the primary control device on a daily basis, may be alleviated. Thus, for certain persons such as children or visitors to a premises who may not have own or have access to a mobile phone, they may now be able to use control the extended functional capabilities of the lighting unit simply by using the light switch or infrared remote control unit

BRIEF DESCRIPTION OF THE DRAWINGS

The present invention will become more fully understood from the following detailed description of a preferred but non-limiting embodiment thereof, described in connection with the accompanying drawings, wherein.

DETAILED DESCRIPTION OF THE EMBODIMENTS

A configurable lighting system (400) is shown in FIGS. 1 to 4 in accordance with an embodiment of the present invention. The system comprises a lighting unit (200) which may for instance be implemented in the form of a lamp, luminaire or lightbulb installed in a household premises to provide extended lighting functionality such as brightness dimming, selectable colour scene modes, and white colour temperature adjustment. The lighting unit (200) is connected with a mains power supply (410) and a wall-mounted light switch (420) via existing standard electrical wiring and circuitry (450) installed in the framework of household premises. Typically, the light switch (420) may include for instance a toggle-type switch, a rocker-type switch, a push-button type switch, a dimmer-type switch, a pull-cord type switch, and an electronic-type switch each of which, in standard usage, is operable between first and second operational positions (or operational states) to enable switching of the lighting unit (200) on or off.

Figure 1:
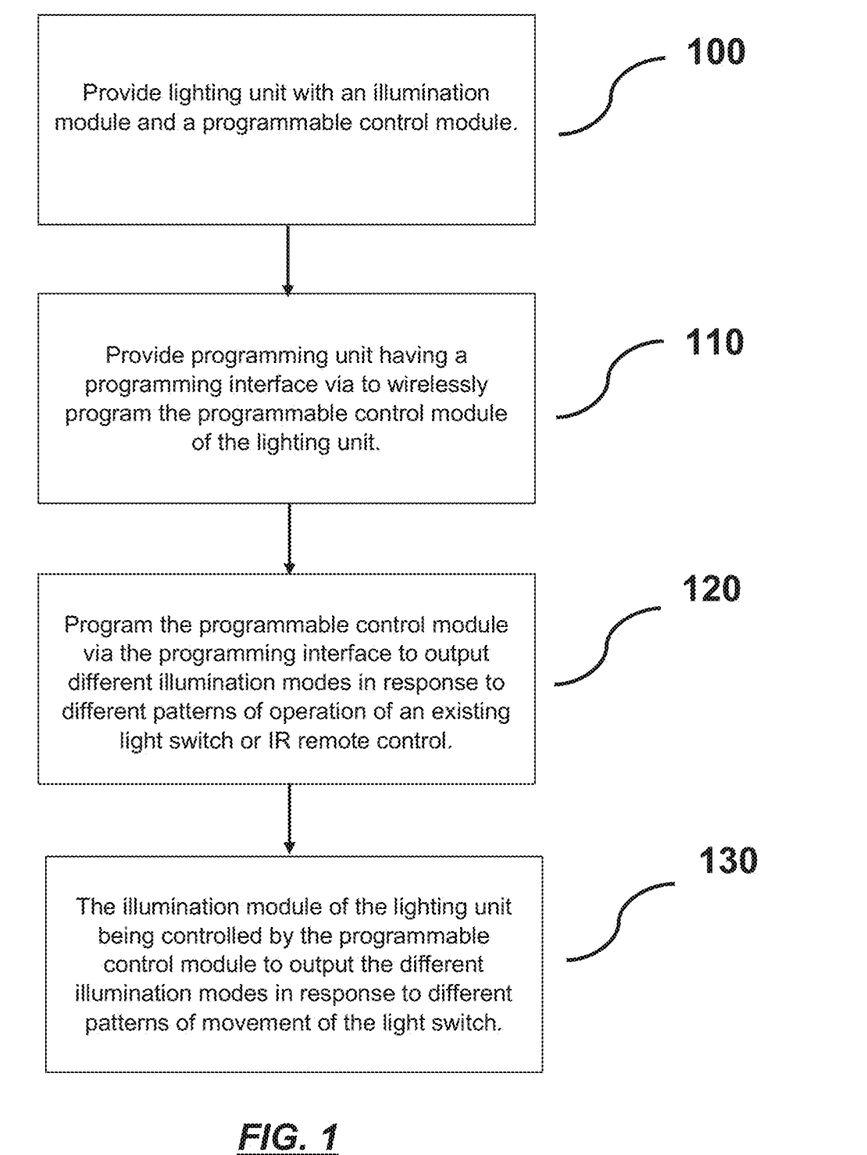
FIG. 1 shows a flow-diagram of method steps for operation of a configurable a lighting system in accordance with an embodiment of the present invention.
Figure 2:
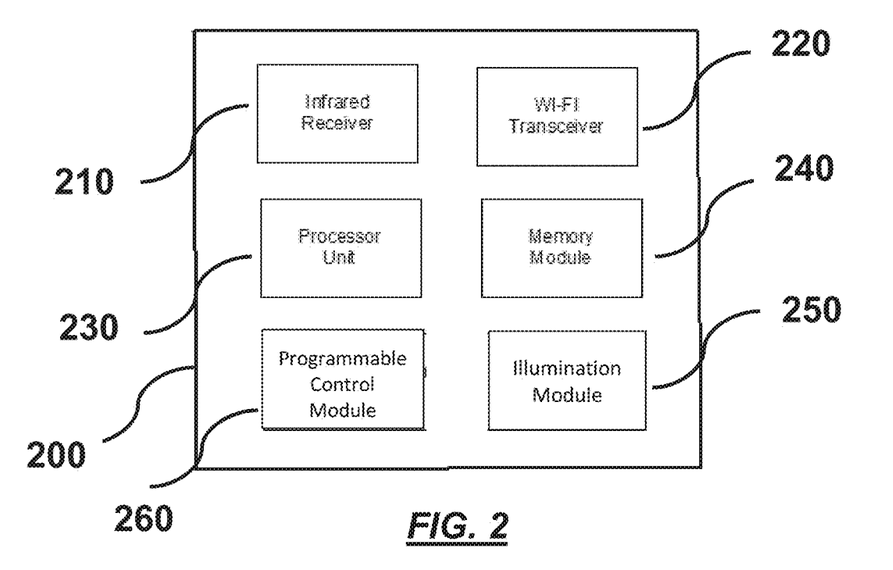
FIG. 2 shows a functional block diagram of a lighting unit used in embodiments of the present invention.

As shown in FIG. 2, the lighting unit (200) comprises an illumination module (250), a processor unit (230), a programmable control module (260), and a memory module (240) for storing software programs and data required to perform basic functions as well as to store user-defined settings relating to a set of illumination modes which may be output by the illumination module (250) of the lighting unit (200). The lighting unit (200) also comprises an IR communication module (210) having an IR receiver (210) for receiving IR control signals from an IR remote control (430), and, a radio frequency (RF) communication module (220) comprising an RF transceiver (220) for communication via an RF signaling link with an RF remote control unit (300). In this embodiment the IR communication module (210) and the RF communication module (220) are integrally formed in the PCB circuitry of the lighting unit (200). The broad step of providing a lighting unit (200) having the programmable control module (260) is depicted in block (100) of FIG. 1.

The IR remote control (430) includes a keypad with a plurality of control buttons disposed thereon that are pre-configured to transmit a standardised encoded IR control signals to the lighting unit (200) when pressed. The processor unit (230) of the lighting unit (200) is configured to recognise different standardised encoded IR control signals that are received from the IR remote control (430) via the IR receiver module (210) of the lighting unit (200) when the control buttons of the IR remote control (430) are pressed. In use, one control button may be operated by the user, but typically multiple control buttons may be operated by the user. Similarly, the processor unit (230) of the lighting unit (200) is configured with suitable signal processing circuitry to sense and process signal waveform characteristics indicative not only of when the light switch (420) is moved between an "ON" "OFF" positions, but also, the durations of movement of the switch between ON and OFF positions, the speed and/or frequency of movement of the switch between operational positions, how long the switch is toggled in each operational position during multiple movements of the toggle between the ON and OFF positions, and so on.

Figure 3:
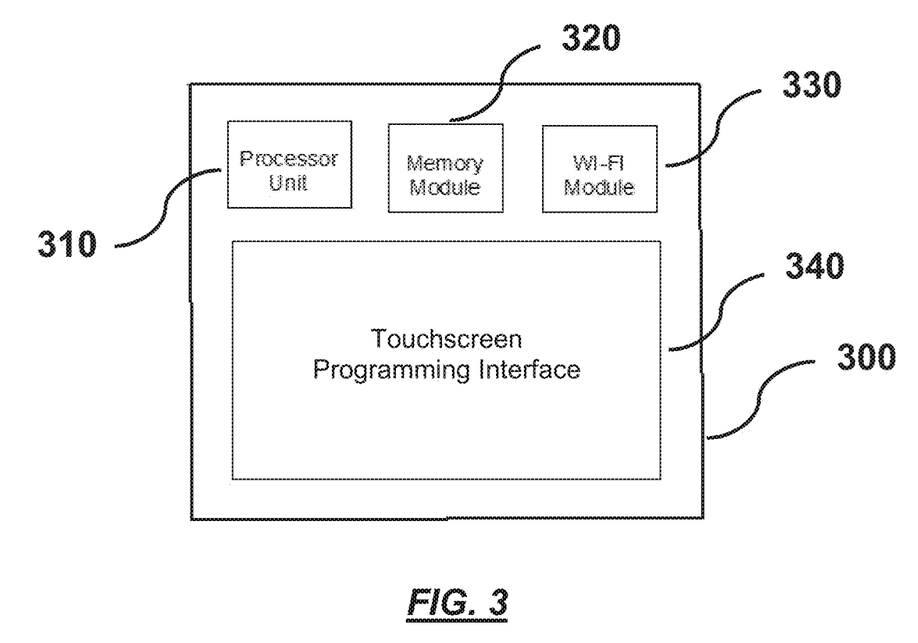
FIG. 3 shows a functional block diagram of a radio-frequency remote control unit in accordance with an embodiment of the present invention.

Referring now to FIG. 3, the RF remote control unit (300) includes a processor unit (310), a memory module (320), a WI-FI transceiver module (330) for providing WI-FI based communication with the lighting unit (200) via a WI-FI router (440), and a touchscreen display (340). In alternate embodiments it is possible that the RF remote control unit (300) may operate based on Bluetooth or Zigbee radio frequency communication standards and protocols or any other suitable radio frequency platform technology without departing from the overall objectives and spirit of the invention. Although an application specific RF remote control unit (300) may be provided for use with this system, a smartphone (300) having an in-built WI-FI transceiver module may conveniently utilised as the RF remote control unit. It would be appreciated that in alternative embodiments, a tablet type device, a desktop computer device, a portable computer device, a personal digital assistant and so on may also conceivably be configured for use as the RF remote control unit (300) if so required. It would be appreciated that in these embodiments that although the RF remote control unit (300) is configured for wireless communication with the lighting unit (200), the RF remote control unit may itself be wired to a local communication network. For instance a desktop computer may be utilised as the programming unit so as to be in wireless communication with the lighting unit (200) via a WI-FI signaling link, but it may also be wired by Ethernet connection to a wireless router via which it may communicate wirelessly with the lighting unit (200). Also, it would be appreciated that the programming unit may be in either direct or indirect wireless communication with the lighting unit (200), for instance, via an intermediate wireless router device or the like. Conveniently, this allows the option of using a laptop computer, desktop computer or tablet that is for instance in wireless communication with the lighting unit (200) via a WI-FI router, to be utilised as the programming unit for programming the lighting unit's (200) operational behaviour, instead of necessarily using a mobile smartphone which may have more limited user-interactive interface capabilities.

A software application may be downloaded into a memory module (320) of the smartphone (300) from an online server via an Internet connection (or other communication network). The software application is executable by the processor unit (310) of the smartphone (300) to provide a programming interface on the touchscreen display (340) via which the user is able to program the lighting unit (200) as to how it will thereafter operate in response control signals received from the light switch (420) and/or from the IR Remote control unit (430). Specifically, the user is able to select via interactive menus presented on the touchscreen display (340), which specific pre-defined illumination modes (i.e. in terms of brightness, colour characteristics, white colour temperature, or a combination thereof) are to be output by the illumination module (250) of the lighting unit (200) in response to specific predefined patterns of operation of the light switch (420) or predefined patterns of operation of control buttons of the IR remote control (430). All data defining the programming selections entered via the programming interface (340) are communicated to and stored by the programmable control module (260) of the lighting unit (200) via the RF signaling link so that that during use of the lighting unit (200), in accordance with this novel system, the programmable control module (260) controls the illumination module (250), with reference to the stored programming data and its internal control logic, to output the appropriately programmed illumination modes corresponding to the specific patterns of operation of the light switch (420) or specific patterns of operation of control buttons of the IR remote control (430) that are received via the IR Receiver (210) and processor unit (230) of the lighting unit (200). In alternate embodiments of the present invention, it is possible that the programming unit may not comprise a touchscreen display and may for instance be implemented using any suitable interface to allow the user to input programming instructions to the programmable control module (260) of the lighting unit (200) for instance including a mouse-controllable input interface, a gesture-controllable input interface, and a voice-controllable input interface. The broad steps of providing a programming unit to wirelessly program the programmable control module (260) of the lighting unit (200) and then programming the programmable control unit (260) is depicted by blocks (110) and (120) respectively of FIG. 1.

Figure 4:
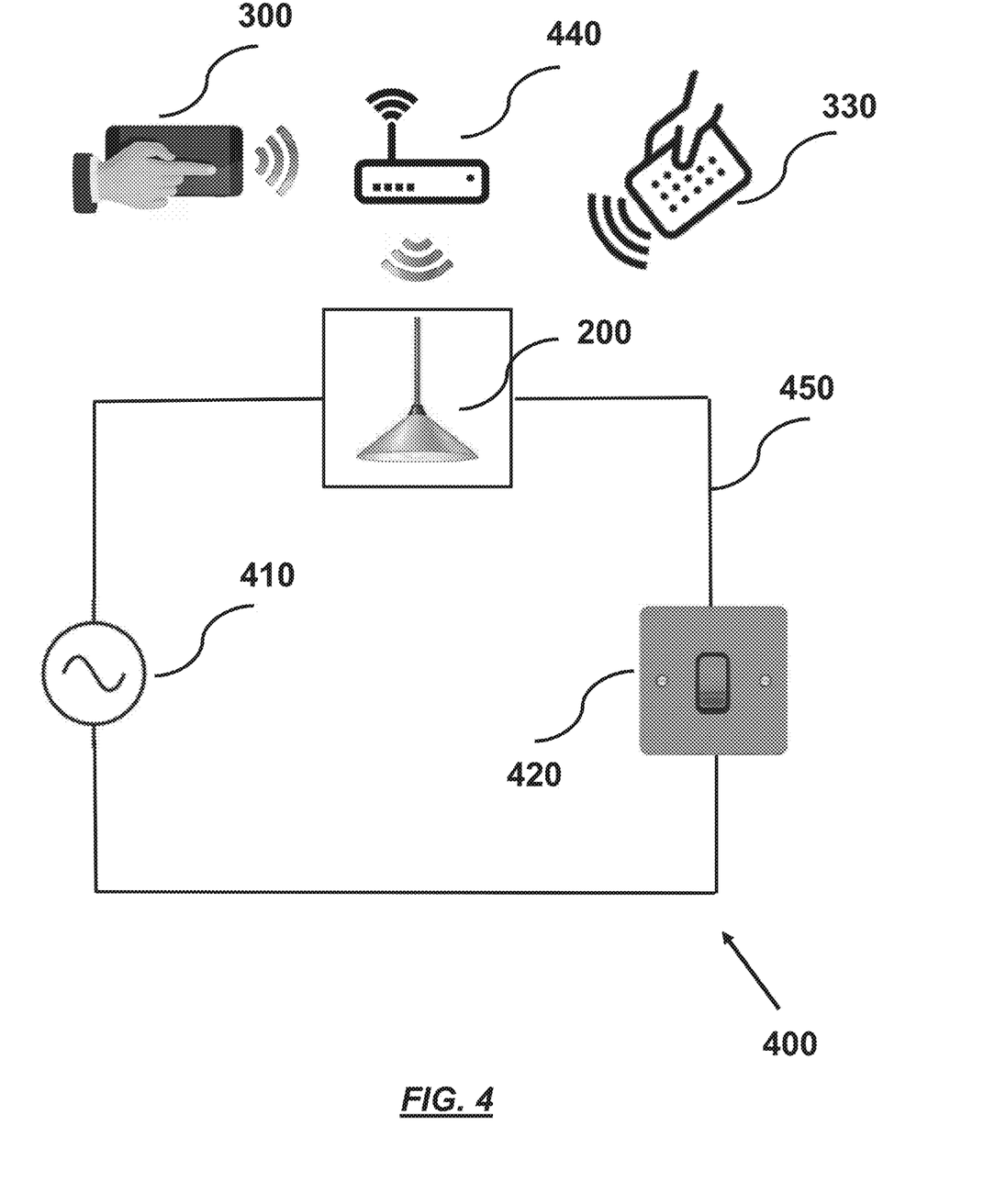
FIG. 4 shows a block diagram of a lighting installation in a household premises and control devices including a light switch, IR remote control unit and RF remote control unit that are used collectively to configure operation of the lighting system.

The patterns of movement of the light switch (420) between the first and second operational positions may each defined by pattern of movement characteristics such as:
   i. a number of times the light switch (420) is moved between the first and second operational positions;
   ii. a speed of movement of the light switch (420) between the first and second operational positions;

iii. relative speeds of movement of the light switch (420) between the first and second operational positions during multiple movements of the light switch (420) between the first and second operational positions;

iv. a duration of time the light switch (420) is maintained in at least one of the first and second operational positions during multiple movements of the light switch (420) between the first and second operational positions;

v. relative durations of time the light switch (420) is maintained in at least one of the first and second operational positions during multiple movements of the light switch (420) between the first and second operational positions;

vi. a frequency of movements of the light switch (420) between the first and second operational positions over multiple movements between the first and second operational positions;

vii. relative frequencies of movements of the light switch (420) between the first and second operational positions during multiple movements of the light switch (420) between the first and second operational positions;

viii. a time of day at which the light switch (420) is operated; and ix. a specific order or sequence in which characteristics defined in (i)-(viii) occur in the patterns of movement.

Similarly, the patterns of operation of the control buttons of the IR remote control (430) may each be defined by operational characteristics such as:

i. a number of times the at least one control button of the infrared remote control is operated;

ii. a speed of operation of the at least one control button of the infrared remote control;

iii. relative speeds of operation of multiple control buttons of the infrared remote control;

iv. a duration of time between operation of multiple control buttons of the infrared remote control;

v. relative durations of time between operation of multiple control buttons of the infrared remote control;

vi. a frequency of operations of the at least one control button;

vii. relative frequencies of operations of the at least one control button;

viii. a time of day at the at least one control button is operated; and ix. a specific order or sequence in which characteristics defined in (i)-(viii) occur in the patterns of operation.

In this embodiment, the specific patterns of operation of the light switch (420) and specific patterns of operation of control buttons of the IR remote control (430) that may be selected by the user to trigger output of specific corresponding illumination modes by the illumination module (250), are all predefined in the system. Therefore, in the smartphone programming interface (340), the user will be presented with a selection of predefined patterns which the user will then match up with a desired illumination mode that can be also selected via the programming interface (340). For instance, one predefined pattern of operation of the light switch (200) that may be presented to the user on the display in order to cause the illumination module (250) to output a warm white light at 30% brightness could include the following pattern of operation:

(i) toggling the light switch into an "ON" position;
(ii) then toggling the light switch into an "OFF" position; and
(iii) then toggling light switch into an "ON" position within 3 seconds.

Each pattern of movement of the light switch will typically involve multiple movements of the light switch between its ON and OFF positions so that this may assist in providing the processor unit (230) of the lighting unit (200) with a suitable amount of movement characteristics to distinguish the pattern from other potential patterns of movement of the light switch during use of the system. Other ways in which the light switch may be operated for instance may involve the user toggling the switch back and forth for at least 2 seconds at a relative fast frequency of movement, and then, toggling the switch back and forth for at least 2 second in a relative slow frequency of movement. The relative change in frequency of movement of the switch may in itself constitute an identifiable characteristic of the pattern of movement in order for the processor unit (230) and programmable control module (260) to identify and cause the illumination module (250) to output an appropriate illumination mode.

For convenience and expediency patterns of movement/operation of the light switch (420) and IR remote control (430) are predefined for the user in this embodiment. However, it is possible in alternate embodiments that the user may be able to manually define these via the programming interface (340) on the smartphone (300).

The illumination modes that may be programmed for output by the illumination module (250) will typically include a combination of the following illumination mode characteristics:

i. an emitted colour characteristic;
ii. an emitted brightness characteristic;
iii. an emitted white light colour temperature;
iv. a rate of change in at least one of the illumination mode characteristics in (i)-(iii); and
v. a combination of any one of illumination mode characteristics in (i)-(iii).

Once again, for simplicity and convenience, in this embodiment the illumination modes are predefined in the smartphone (200) application for the user's selection. However, it is also possible in alternate embodiments that the user may be able to manually define the illumination modes via the programming interface (340) on the smartphone (300).

Once the programmable control module (560) of the lighting unit (200) has been suitably programmed using the smartphone (300), the user is then able to conveniently utilise the light switch (420) and/or IR remote control (430) to control the operation of the lighting unit (200) on a day-to-day basis as the light switch (420) and IR remote control (430) are ubiquitous and convenient for the user to utilise and alleviates the need to use expensive and overly-complicated devices for daily operation of the lighting system. The broad step of the illumination module (250) of the lighting unit (200) being controlled by the programmable control module (260) to output the different illumination modes in response to different detected patterns of movement of the light switch (420) or different detected patterns of operation of the IR remote control (430) buttons is depicted by block (130) of FIG. 1. It would be appreciated that this novel method and system conveniently allows a user to now utilise an existing light switch (420) installation and/or an existing IR remote control (430) to control a lighting unit to output a relatively larger number of illumination modes than may ordinarily be achievable through ordinary usage of such control devices.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed is:

1. A configurable lighting unit comprising:
   an illumination module configured to output a plurality of different illumination modes;
   a signal processing circuit configured to sense a plurality of different patterns in toggling of a power supply;
   a radio frequency communication module configured to wirelessly receive data defining one or more programming selections, each of the one or more programming selections matching an illumination mode from the plurality of different illumination modes to a pattern from the plurality of different patterns; and
   a programmable control module configured to store the one or more programming selections and, in response to the signal processing circuit sensing a pattern found in one of the one or more programming selections, to control the illumination module to output the illumination mode matched to the pattern in the one of the one or more programming selections;
   wherein each of the plurality of different patterns in toggling of the power supply are defined by different numbers of times the power supply is toggled and/or different speeds at which the power supply is toggled.

2. The configurable lighting unit as claimed in claim 1, wherein the radio frequency communications module operates based on a Wi-Fi, a Bluetooth, or a Zigbee communication protocol.

3. The configurable lighting unit as claimed in claim 1, wherein the plurality of different patterns in the toggling of the power supply are each defined by at least one of the following characteristics:
   i. a number of times the power supply is toggled;
   ii. a speed at which the power supply is toggled;
   iii. relative speeds at which the power supply is toggled during multiple toggles of the power supply;
   iv. a duration of time the power supply is maintained in on or off positions during multiple toggles of the power supply;
   v. relative duration of time the power supply is maintained in on or off positions during multiple toggles of the power supply;
   vi. a frequency at which the power supply is toggles during multiple ogles of the power supply;
   vii. relative frequencies at which the power supply is toggled during multiple toggles of the power supply;
   viii. a time of day at which the power supply is toggled; and
   ix. a specific order or sequence of the characteristics defined in (i)-(viii).

4. The configurable lighting unit system as claimed in claim 1, wherein the plurality of different illumination modes are each defined by at least one of the following characteristics:
   i. an emitted color characteristic;
   ii. an emitted brightness characteristic;
   iii. an emitted white light color temperature;
   iv. a rate of change in at least one of the mode characteristics in (i)-(iii); and
   v. a combination of any one of the characteristics in (i)-(iii).

5. The configurable lighting unit as claimed in claim 1, wherein the toggling of the power supply comprises toggling of the power supply between an on state and an off state.

6. The configurable lighting unit as claimed in claim 1, wherein the toggling of the power supply is by a light switch in electrical communication with the lighting unit via an electrical circuit, the light switch being operable in a first and a second operational position.

7. The configurable lighting unit as claimed in claim 6, wherein the light switch includes at least one of a toggle type switch, a push-button type switch, a rocker type switch, a dimmer type switch, a pull-cord type switch, and an electronic type switch.

8. The configurable lighting unit as claimed in claim 6, wherein the plurality of different patterns in toggling of the power supply comprise different patterns of movement of the light switch between the first and second operational positions.

9. The configurable lighting unit as claimed in claim 1 further comprising a memory module storing settings of the plurality of different illumination modes, wherein the programmable control module is configured, in response to the signal processing circuit sensing the pattern, to control the illumination module to output the illumination mode matched to the pattern in the one of the one or more programming selections by retrieving the setting of the illumination mode from the memory module.

10. The configurable lighting unit as claimed in claim 9, wherein the radio frequency communication module is configured to wirelessly receive the settings of the plurality of different illumination modes for storage on the memory module.

11. A method for configuring a lighting unit comprising an illumination module, a signal processing circuit, and a programmable control module, the illumination module configured to output a plurality of different illumination modes, the signal processing circuit configured to sense a plurality of different patterns in toggling of a power supply, and the programmable control module configured to control the illumination module, the method comprising the steps of:
   displaying, on a display, a selection of the plurality of different illumination modes and the plurality of different patterns;
   providing, based on input from a user, one or more programming selections each matching an illumination mode from the plurality of different illumination modes to a pattern from the plurality of different patterns; and
   communicating to the lighting unit, via a radio frequency communication link, the one or more programming selections;
   wherein the one or more programming selections are configured to program the programmable control module to control the illumination module, in response to the signal processing circuit sensing a pattern found in one of the one or more programming selections, to output the illumination mode matched to the pattern in the one of the one or more programming selections; and
   wherein each of the plurality of different patterns in toggling of the power supply are defined by different numbers of times the power supply is toggled and/or different speeds at which the power supply is toggled.

12. The method for configuring a lighting unit as claimed in claim 11, wherein the radio frequency communications link operates based on a Wi-Fi, a Bluetooth, or a Zigbee communication protocol.

13. The method for configuring a lighting unit as claimed in claim 11, wherein the plurality of different patterns in the toggling of the power supply are each defined by at least one of the following characteristics:
   i. a number of times the power supply is toggled;
   ii. a speed at which the power supply is toggled;
   iii. relative speeds at which the power supply is toggled during multiple toggles of the power supply;
   iv. a duration of time the power supply is maintained in on or off positions during multiple toggles of the power supply;
   v. relative durations of time the power supply is maintained in on or off positions during multiple toggles of the power supply;
   vi. a frequency at which the power supply is toggled during multiple toggles of the power supply;
   vii. relative frequencies at which the power supply is toggled during multiple toggles of the power supply;
   viii. a time of day at which the power supply is toggled; and
   ix. a specific order or sequence of the characteristics defined in (i)-(viii).

14. The method for configuring a lighting unit as claimed in claim 13 further comprising the steps of:
   receiving, from the user, a manual definition of the characteristics of at least one pattern from the plurality of different patterns; and
   communicating to the lighting unit, via the radio frequency communication link, the at least one pattern.

15. The method for configuring a lighting unit as claimed in claim 11, wherein the plurality of different illumination modes are each defined by at least one of the following characteristics:
   i. an emitted color characteristic;
   ii. an emitted brightness characteristic;
   iii. an emitted white light color temperature;
   iv. a rate of change in at least one of the characteristics in (i)-(iii); and
   v. a combination of any one of the characteristics in (i)-(iii).

16. The method for configuring a lighting unit as claimed in claim 15 further comprising the steps of:
   receiving, from the user, a manual definition of the characteristics of at least one illumination mode from the plurality of different illumination modes; and
   communicating to the lighting unit, via the radio frequency communication link, the at least one illumination mode.

17. The method for configuring a lighting unit as claimed in claim 11, wherein the programming interface of the programming unit is configured to allow a user to manually define the pattern of movement characteristics of at least one of the patterns of movement.

18. The method for configuring a lighting unit as claimed in claim 11, wherein the display comprises a programming interface being one of a touchscreen display, a mouse controllable input interface, a gesture-controllable input interface, and a voice-controllable input interface, and wherein the one or more programming selections are provided based on input, by the user, from the programming interface.

19. The method for configuring a lighting unit as claimed in claim 11, wherein the toggling of the power supply comprises toggling of the power supply between an on state and an off state.

20. A non-transitory computer program product for implementing the method of claim 11.

* * * * *